US010004110B2

(12) United States Patent
Block et al.

(10) Patent No.: US 10,004,110 B2
(45) Date of Patent: Jun. 19, 2018

(54) METHOD AND SYSTEM FOR COMMUNICATION SYSTEM INTEROPERABILITY

(75) Inventors: Robert S. Block, Reno, NV (US); Richard Riccoboni, New Suffolk, NY (US); Alexander A. Wenger, Melville, NY (US); Rene Albert Stiegler, III, Mobile, AL (US); Alan Spindel, Murfreesboro, TN (US)

(73) Assignee: INTEROPERABILITY TECHNOLOGIES GROUP LLC, Reno, NV (US)

( * ) Notice: Subject to any disclaimer, the term of this patent is extended or adjusted under 35 U.S.C. 154(b) by 1041 days.

(21) Appl. No.: 11/662,278

(22) PCT Filed: Sep. 9, 2005

(86) PCT No.: PCT/US2005/032137
§ 371 (c)(1),
(2), (4) Date: Jun. 30, 2008

(87) PCT Pub. No.: WO2006/029306
PCT Pub. Date: Mar. 16, 2006

(65) Prior Publication Data
US 2008/0274761 A1    Nov. 6, 2008

Related U.S. Application Data

(60) Provisional application No. 60/608,181, filed on Sep. 9, 2004, provisional application No. 60/608,180, filed on Sep. 9, 2004.

(51) Int. Cl.
*H04W 40/00* (2009.01)
*H04W 92/02* (2009.01)
*H04M 3/42* (2006.01)

(52) U.S. Cl.
CPC ....... *H04W 92/02* (2013.01); *H04M 3/42068* (2013.01); *H04M 3/42365* (2013.01);
(Continued)

(58) Field of Classification Search
CPC ....... H04W 92/02; H04W 76/50; H04W 4/90; H04M 3/42068; H04M 3/42365
See application file for complete search history.

(56) References Cited

U.S. PATENT DOCUMENTS

| 5,055,845 A | 10/1991 | Ridkosil |
| 5,231,397 A | 7/1993 | Ridkosil |

(Continued)

FOREIGN PATENT DOCUMENTS

WO    WO 99/63728    12/1999

OTHER PUBLICATIONS

International Search Report and Written Opinion issued in PCT Application No. PCT/US05/32136 (corresponding to U.S. Appl. No. 11/662,277) dated Jun. 3, 2008.

(Continued)

*Primary Examiner* — Wayne H Cai
(74) *Attorney, Agent, or Firm* — Buchanan Ingersoll & Rooney PC

(57) ABSTRACT

An system for interlinking communication devices having different communication mechanisms, includes a first device having a plurality of radios that are software configurable to operate on different channels, and/or different frequencies, and/or via different protocols, and a switch arranged to selectively interconnect audio signals with audio inputs of at least one of the plurality of radios, wherein the audio signals are provided by an operator of the first device or comprise demodulated audio output of one of the plurality of radios.

23 Claims, 3 Drawing Sheets

(52) U.S. Cl.
CPC .......... *H04M 2207/18* (2013.01); *H04W 4/90* (2018.02); *H04W 76/50* (2018.02)

(56) References Cited

U.S. PATENT DOCUMENTS

| | | | | |
|---|---|---|---|---|
| 5,566,388 | A | * | 10/1996 | Brame et al. .................. 370/340 |
| 5,754,960 | A | * | 5/1998 | Downs et al. ................. 455/508 |
| 5,815,799 | A | | 9/1998 | Barnes et al. |
| 6,374,115 | B1 | | 4/2002 | Barns et al. |
| 6,643,618 | B2 | * | 11/2003 | Matsuoka ............. G10L 19/012 370/289 |
| 6,701,156 | B2 | | 3/2004 | Akhteruzzaman et al. |
| 7,072,833 | B2 | * | 7/2006 | Rajan ........................... 704/233 |
| 8,315,865 | B2 | * | 11/2012 | Kuris ...................... G10L 25/78 379/88.01 |
| 2002/0035633 | A1 | * | 3/2002 | Bose et al. .................... 709/230 |
| 2003/0026289 | A1 | | 2/2003 | Mukherjee et al. |
| 2003/0033528 | A1 | | 2/2003 | Ozog et al. |
| 2003/0073440 | A1 | | 4/2003 | Mukherjee et al. |
| 2003/0078029 | A1 | | 4/2003 | Petite |
| 2003/0097317 | A1 | | 5/2003 | Burk et al. |
| 2003/0158954 | A1 | | 8/2003 | Williams |
| 2003/0176180 | A1 | | 9/2003 | Deinzer |
| 2003/0207693 | A1 | | 11/2003 | Roderique |
| 2003/0212904 | A1 | | 11/2003 | Randle et al. |
| 2004/0121729 | A1 | | 6/2004 | Herndon et al. |
| 2005/0027520 | A1 | * | 2/2005 | Mattila et al. ................ 704/228 |
| 2005/0071642 | A1 | | 3/2005 | Moghe et al. |
| 2005/0096900 | A1 | * | 5/2005 | Bossemeyer ........... G10L 25/48 704/219 |
| 2005/0137864 | A1 | * | 6/2005 | Valve et al. ................... 704/227 |
| 2005/0170808 | A1 | | 8/2005 | Hamilton |
| 2005/0227657 | A1 | * | 10/2005 | Frankkila et al. ............. 455/255 |
| 2009/0017853 | A1 | | 1/2009 | Ozog et al. |

OTHER PUBLICATIONS

International Search Report and Written Opinion issued in corresponding PCT Application No. PCT/US05/32137 dated Jan. 17, 2006.
English translation of Chinese Office Action issued in corresponding Chinese Application 200580035822.2 dated Sep. 25, 2009.
English translation of Chinese Office Action issued in Chinese Application 200580034466.2 (corresponding to U.S. Appl. No. 11/662,277) dated Apr. 14, 2010.
Ozog et al., Copending U.S. Appl. No. 11/662,277, filed Mar. 17, 2008 entitled "Method and System for Presence Detection in a Communication System".
Second Office Action dated Mar. 9, 2011 in corresponding Chinese Application No. 200580035822.2, and English translation thereof.
First Examination Report dated Jul. 15, 2011 in corresponding Indian Patent Application No. 2094/DELNP/2007.
European Search Report issued in corresponding European Patent Application No. 05794954.7 dated Nov. 10, 2011.
Sep. 21, 2016 European Communication issued by European Patent Office in European Application No. 05 794 954.7.

* cited by examiner

METHOD AND SYSTEM FOR COMMUNICATION SYSTEM INTEROPERABILITY

This application claims priority to U.S. Provisional Application No. 60,608,180 and No. 60/608,181, filed on 9 Sep. 2004, both of which are incorporated by reference in their entirety.

BACKGROUND INFORMATION

Various problems can arise when organizations having different communications systems must communicate with each other. The need to communication can arise, for example, when multiple first response agencies are required to respond to most major emergencies, for example emergencies that require police departments, fire departments, and emergency medical service personnel. Another example is for large scale, prolonged disaster relief, which may involve military units, federal (e.g., FEMA) and state agencies, as well non-governmental relief organizations such as the Red Cross whose efforts can or advantageously should be coordinated. Many first response and support agencies have independent and incompatible communications systems.

One alternative is to equip all responders with multiple radio systems, so that each organization has a system that will communicate with another organization's system. However, in field conditions this can be impractical, and the cost of procuring, maintaining and even operating multiple systems can be expensive. Another alternative is to equip all responders with the same system. However, this may require most agencies to acquire new radios, which can be expensive, and may fail to address the different needs of the different agencies (security, capabilities, etc.) or may require a prohibitively expensive or complex system in order to satisfy requirements of all the agencies. In addition, using one system may result in insufficient spectrum in large municipalities. Yet a third alternative is to equip all responders or agencies with newly designed, frequency/mode agile radios. However, this may require development of new radios, would require replacement of all radios, and may require extensive training on the part of agencies using the new radios, all of which promise to be expensive. A fourth alternative is to select a small capacity switching system, for example with less than fifty talk paths (which would allow twenty-five separate, simultaneous conversations). However, such systems would likely be inadequate except in small emergencies because talk paths would be overloaded with multiple users trying to have separate conversations. Accordingly, a need exists for a comprehensive, scalable, cost-effective and flexible solution.

An exemplary method for interlinking disparate communication systems includes receiving communications from the disparate communication systems at a center including for each system at least one radio configured to communicate with the system, selectively interconnecting the audio outputs and audio inputs of the radios to interconnect the disparate communication systems, and applying at least one squelch filter to the audio outputs to filter the audio outputs, wherein the interconnecting is based on at least one of a filtered output, a hierarchy of the disparate communication systems, and a command input by a human operator.

SUMMARY

An system for interlinking communication devices having different communication mechanisms, includes a first device having a plurality of radios that are software configurable to operate on different channels, and/or different frequencies, and/or via different protocols, and a switch arranged to selectively interconnect audio signals with audio inputs of at least one of the plurality of radios, wherein the audio signals are provided by an operator of the first device or comprise demodulated audio output of one of the plurality of radios.

BRIEF DESCRIPTION OF THE DRAWINGS

The accompanying drawings provide visual representations which will be used to more fully describe the representative embodiments disclosed herein and can be used by those skilled in the art to better understand them and their inherent advantages. In these drawings, like reference numerals identify corresponding elements

DETAILED DESCRIPTION

Figure 1:
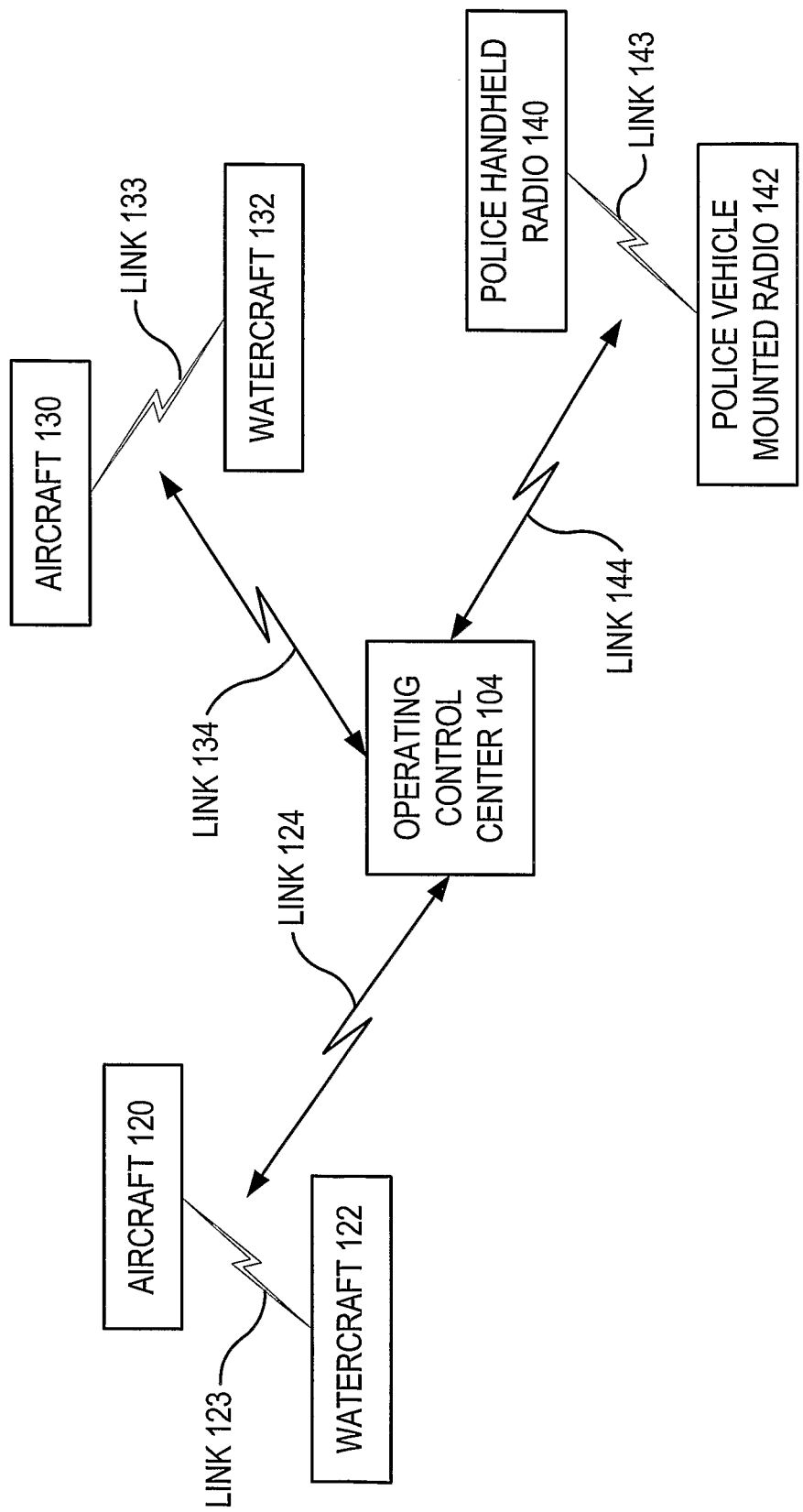
FIG. 1 illustrates an exemplary embodiment.

FIG. 1 illustrates an exemplary embodiment of the present invention, wherein an operating control center 104 provides interoperability to three different, incompatible communication systems. The first system includes an aircraft 120 and a watercraft 122, communicating via a link 123. The second system includes an aircraft 130 and a watercraft 132, communicating via a link 133 that is incompatible with the link 123. The third system includes a police handheld radio 140 in communication with a police vehicle-mounted radio 142, via a link 143 that is incompatible with the links 133, 123. The operating control center 104 has radios that provide links 124, 134, 144 that are respectively compatible with the links 123, 133, 143, and thus the operating control center 104 can provide interoperability (or intercommunication) between the three otherwise incompatible systems.

In an exemplary embodiment, the operating control center 104 includes four-wire cards with E&M (Ear/earth, Mouth/magnetic) signaling, which can for example be software-controlled and/or software-configurable, and which are used to interface multiple radio systems together for providing interoperability. The center 104 also includes radios for communicating with the different systems, and the radios can for example be software-controlled and/or software-configurable. The cards and/or the radios are configured in such a fashion that when a radio in the center 104 connected to a card receives a signal, it sends a signal to the E lead which in turn changes the state of the M lead on all other cards that are connected in conference. Thus, demodulated voice signals output by a first radio, can be input to second radio via the four-wire cards for transmission on a different frequency, via a different communication protocol, etc. than the signal received by the first radio.

For example, three radios A, B, C in the center 104 (which are not shown in FIG. 1, but each of which communicates with a different system outside the center 104, as in FIG. 1) are connected to one each of the cards, and the cards are connected together so that when the receiver of radio A receives a signal it applies this received signal to the E lead of its associated card. That E lead signal causes the M leads on the other cards connected to radios B & C to change state thereby placing radios B & C in the transmit mode, so that the signal received by radio A, is transmitted by radios B and C. Conversely, if radio B receives a signal it would apply this signal to the E lead of its associated card which in turn would cause the M leads of the cards attached to radios A & C to change state thereby placing those radios in the transmit mode. Software within the center 104 can also incorporate commands that allow forcing or override of the state of the E & M leads on individual cards regardless of the status of incoming signals, so that an operator of the center 104 can for example broadcast an emergency signal via all the radios, or give one of the outside radio systems voice to one or more of all the other outside radio systems that the center 104 interconnects or links.

The operating control center can also be provided with a syllabic rate squelch circuit, to distinguish speech from noise or silence. The squelch circuit output can be used within the control center to control the E lead on a radio's associated card. This serves a two-fold purpose. It allows voice control of a radio transmitter from a two wire circuit and it overcomes the problem of squelch hang time found on many trunk and conventional repeater systems.

In an exemplary embodiment, to solve the squelch hang time problem the output of the syllabic rate squelch is connected to a logical "AND" gate along with the carrier squelch of the associated radio. This means that both the radio carrier squelch and the syllabic rate squelch must have detected a signal to enable the E lead of the associated radio's card. A command, for example a software command that can be selectively invoked by a human operator and/or automatically invoked by the center 104 (based for example on different operating conditions), can also be provided to enable the audio paths and also the signaling paths. In an exemplary embodiment, the center 104 allows or provides commands to be sent to the switch to enable audio only or audio plus signaling. This can for example be accomplished by batching a series of commands to create various functions.

In an exemplary embodiment, the center 104 includes software and/or hardware processing capability to process demodulated voice signals output by radio receivers of the center 104, to harmonize them, make them more uniform, or otherwise improve the quality or intelligibility of the voice signals demodulated at the disparate communication systems interlinked by the center 104, for example to overcome or compensate for differences in the way that the disparate communications systems sample and recreate voice signals. For example, baseband digital signals can be normalized and summed, so that every participant's voice or speech has the same or similar volume. In another exemplary embodiment, the radios of the center 104 can be remotely configured and/or controlled, for example by control signals received by the center 104 via any type of communication link and/or protocol (radio, land-line, etc.). For example, the radios of the center 104 can be frequency-agile radios, and/or capable of communicating via different protocols, and their frequencies and/or protocols can be remotely selected, tuned, etc. via commands received by the center 104. The radios can for example one or more of wide band capability, sweep capability, frequency agility, software-programmability/configurability, encryption capability, spread spectrum capability, and so forth.

In an exemplary embodiment, a different squelch circuit or algorithm can be provided for one or more, or for each of, the receivers of the radios in the center 104, to distinguish noise or silence from speech. To clarify, a squelch filter can be implemented in hardware and/or software via squelch circuits and/or algorithms. The particular squelch filter for a receiver can be selected (automatically, or manually by a human operator) based on the outside radio system or particular outside radio that is communicating with the center 104, where that information is known, and can be manually selected by a human operator. For example, the human operator can try different squelch circuits or algorithms (squelch filters) for a particular receiver or channel, and select the one he or she finds to be most effective. Different squelch algorithms or techniques can include, for example: discerning human speech based on symmetry of a received audio wave form (asymmetry tends to indicate human speech); measuring total signal energy over a given time period, and distinguishing speech from steady-state background noise and transient noise based on a rate of change and duration of change in signal energy level; and discerning presence of human speech in an, audio signal based on frequencies over which energy is distributed and ratios of those energies (for example, human speech is often centered near 900 hertz). Any squelch algorithm or technique can be provided. In addition, squelch filter output can be used to determine which radio audio output should be supplied to audio inputs of other radios for broadcast (e.g., in periods of silence, the first radio audio output that makes it past a squelch filter is broadcast by the other radios until done, other squelch outputs are disabled until the first is done or until a time period elapses). Alternatively or in addition, the radios can be organized in a hierarchy (e.g. by an operator of the center, or automatically based on entities participating in the various communications), and when multiple radios have audio output emerging from their respective squelch filters then the highest ranking radio's audio output is provided to audio inputs of the other participating radios.

Figure 2:
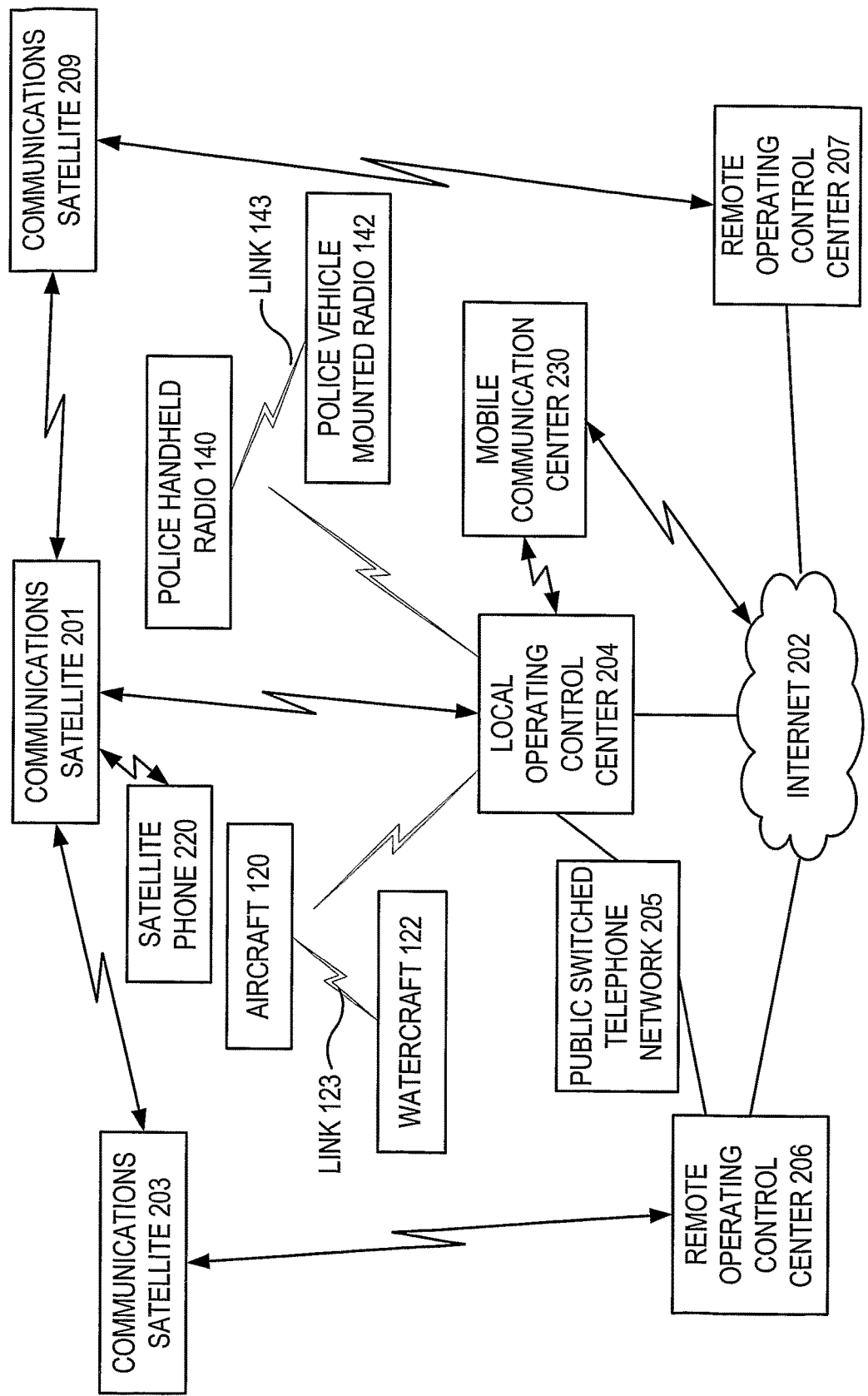
FIG. 2 illustrates an exemplary embodiment.

FIG. 2 illustrates another exemplary embodiment. The control centers 204, 206, 207 can include the features and capabilities described above with respect to the center 104. As shown in FIG. 2, the center 204 is a local center, that communicates directly with, and provides interoperability to, outside radio communication systems such as a first system including the aircraft 120 and the watercraft 122 communicating via the link 123, a second system including the police handheld radio 140 communicating with the police vehicle mounted radio 142 via the link 143, and a third system including the mobile communication center 230 (which can for example communicate with other entities or systems not shown in FIG. 2). Three outside communication systems are shown by way of example, but any number of systems can be accommodated. In addition, interoperability can be provided indirectly. For example, the center 204 can communicate with the satellite phone 220 via the communications satellite 201, and can thus connect the satellite phone 220 to other systems such as those using the links 123, 143. FIG. 2 also shows multiple communication paths. For example, the local center 204 can communicate with the remote centers 206, 207 via the Internet 202, the communications satellites 201, 203, 209, the public switched telephone network 205, and so forth, thus providing redundancy. Thus, in the event the local center 204 lost direct communication with the Internet 202, the center 204 could communicate with the remote center 207 via the mobile communication center 230 and the Internet 202. The remote centers 206, 207 can provide support to the local center 204, and can commandeer or influence operations of the local center 204, for example by sending commands to configure the radios or other communication devices or capabilities of the local center 204.

The centers can communicate via secure channels, for example using various encryption and/or spread spectrum techniques. In exemplary embodiments, the centers include voice and/or code recognition, so that users of radio devices for which interoperability functions are being provided, for example users of police radios at the scene of an emergency, can relay commands or requests to the center (204, 206, 104, 207) that can be automatically processed. This can include, for example, voice recognition, so that a fire chief can issue an oral request to be connected to the police chief on a different communication system, and the responsible center can perceive the oral command using voice recognition software or capability and then automatically connect that communication channel to that of the police chief. Other mechanisms can be used, for example tonal or alphanumeric codes, which can be recognized either by pitch or by voice recognition, so that users or clients for whom interoperability services are being provided can place requests that can be automatically be fulfilled in whole or in part.

Figure 3:
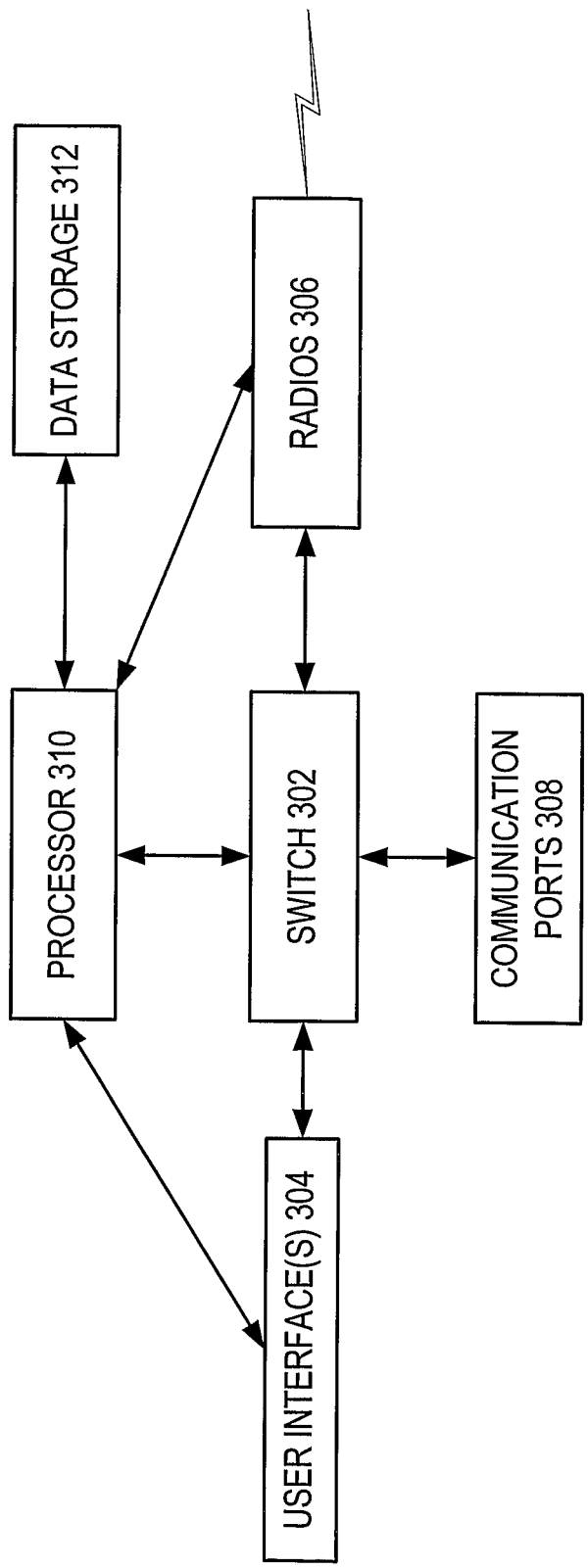
FIG. 3 illustrates exemplary contents of an Operating Control Center.

FIG. 3 shows exemplary contents of the centers 104, 204, 206, 207. As shown in FIG. 3, an operating control center (local or remote) can include user interfaces 304, a processor 310, a switch 302, communication ports 308, radios 306, and data storage 312. The user interfaces 304 can include, for example, computer terminals or control consoles, display screens, keyboards, voice or speech recognition, or any other user interface that allows a human operator to communicate with the center. A center can have multiple control consoles, and different control consoles can have different places in a hierarchy. For example, operator control consoles can have a basic position, and supervisor control consoles can have all the capabilities of operator consoles, and have the ability to override operator control consoles or issue contrary commands, for example to broadcast urgent announcements. The consoles can be local or remote, for example a console can connect to a center via wireless or other communication link from a different geographic location, and consoles at one center can be used to issue commands to another center. The consoles can also display a waiting queue of received communications awaiting processing (e.g. connection to a different communications system or entity via interoperability functions provided by the center, or any other request), for example in an order received, or ordered by category (e.g. of communication technical type, by parties such as individual or organization or class of organization such as function—law enforcement, medical—or government level—state, local, federal, and so forth). The console can also include or display a listing of communications in progress or active communication paths (e.g. different channels or communication systems linked via the center), which the operator of the console can select for monitoring, connection/disconnection, override broadcast, etc. For example, a console operator could select all fire and police communication channels for a particular incident and override communications to announce that a building is about to come down and all personnel should immediately evacuate or prepare, and so forth. Generally, operator control consoles allow operators to speak to other operators (in the same center or in a different center), join in or monitor communications passing through the center, access databases such as look-up tables which indicate contact information for different agencies or individuals, access or determine the last known communications of specific users and the phone number or other communication link information used for the communications (which can be used to try and contact the user), and so forth.

The processor 310 can be a microprocessor or set of processors, and effectively represents computing or processing capability available to the center, for example to apply squelch algorithms and other various functions. The switch 302 can be a software-controlled switch that selectively interconnects voice or data signals among the radios 306 as well as to any other modules or functions of the center, for example to the communication ports 308, and or to the data storage 312 (either indirectly via the processor 310, or directly via one or more links or paths not shown in FIG. 3). The data storage can record communications for later analysis and playback, can provide information to support operation of the center (e.g., communication protocol settings, performance characteristics of communication protocols, systems and/or devices that the center may interconnect or provide interoperability for, contact telephone numbers or other contact information for different local, state, federal, non-governmental or other agencies or entities who might need to be quickly apprised or involved in the handling of an emergency, and so forth). The radios 306 can include frequency-agile radios, software-programmable or configurable radios, VHF, UHF, aircraft, shore-to-ship, broad band, Trunk A, Trunk B, Trunk C (spline), wireless telecommunication radios, radios for handling data or other imagery such as video, TV/TX, facility radio, CB radio, Ham radio, telemedicine radio(s) (e.g., for receiving signals from or communicating with remote medical diagnostic equipment, EKG devices, and so forth), or any other kind of radio or wireless transmission device. The communication ports 308 can include ports to public switched telephone networks, cable communications, ISDN, cable modem, DSL or other data transmission media, and any modem or interface equipment necessary or desirable to support communication via the particular medium.

The switch 302 can, for example, be an Eagle Telephonics, Inc. Class 5 non-blocking scaleable central office (capable of providing, for example, 32 lines to thousands of communication lines or channels). The ports 308 and/or radios 306 can include hardware and software radio interface(s) manufactured by ShipCom, LLC, as well as a Link Us All Presence Server that supports automatic detection of devices in use and configuration of communications to meet device requirements. The radios 306 can include equipment necessary to communicate with an L-3 Communications Corporation satellite communication system for fail-safe long distance communications, and the ports 308 can include a secure real-time portal for the Argonne National Laboratory's ERSM (Emergency Response Synchronization Matrix) comprehensive database for synchronized response for all at-risk jurisdictions. The center shown in FIG. 3 can use standard, off-the-shelf, rack-mounted radios for each system to be integrated into an exemplary Interoperable Network consistent with the principles and embodiments of the invention described herein; PSTN (Public Switched Telephone Network), Internet, Intranet, VoIP (Voice Over Internet Protocol), Data, and Video interfaces; and redundant LAN (Local Area Network) and WAN (Wide Area Network) technologies.

In an exemplary embodiment, the center shown in FIG. 3, and/or the centers 104, 204, 206, 207 can include "Presence" technology including (but is not limited to) features disclosed in the following documents which are hereby incorporated by reference: a) U.S. application Ser. No. 10/173, 204, published by the U.S. Patent and Trademark Office as document 20030033528; b) U.S. application Ser. No. 10/180,636, published by the U.S. Patent and Trademark Office as document 20030073440; and c) U.S. application Ser. No. 10/183,031, published by the U.S. Patent and Trademark Office as document 20030026289. If a user from one jurisdiction has a failure of his/her communication device (radio, telephone, PDA, computer, etc) and borrows a communication device from a user from another jurisdiction, Presence technology can be used so that the network will treat the borrowed communication device as if it were a communication device from the original jurisdiction. For example, the user can identify himself to the center, for example by talking with a human operator, or by sending a code to the center via the device, for example a code identifying the user and a code requesting the center to associate the communication device with the user.

The center can also use Presence technology to identify the last device, channel, etc used by a user and when it was last used. Then when another party wants to contact a user, this information can be used or provided automatically seek a connection with the user, or otherwise quickly establish contact with the user. The center can also translate IP addresses and radio ID's to "Caller ID" for use by the Presence System, for example via a table stored in a database accessible to the center, which associates IP addresses, radio ID's, and/or other information (e.g., information unique to or indicative of a particular user or piece of equipment) with a user's or agency's identity. In situations where a WiFi, WiMax or other wideband service is available or made available to responders, Presence technology can configure communications for the best available device (PDA, Phone, Computer, etc.). The center can use Mobile Virtual Network Operator (MVNO) technology to identify users authorized to use cellular, WiFi, WiMax and other radio communication systems during emergency conditions, and can communicate with service providers of those communication systems (or take over operational control over those systems, for example via control mechanisms provided by the operators of those services) to block all other users and thus preserve that communication resource for use by authorized entities to aid them in dealing with the emergency. For example, the blocking can be implement to allow authorized users to communicate among themselves, and/or with any other subscriber, including unauthorized users, but can prevent unauthorized users from placing a call on the network. This approach can be applied to a single cell of a communication system, or to a complete system. The Presence technology is used to identify authorized users. Secure communications such as encryption can be used for communication with authorized users, and can for example be specified by or associated with a particular user or class of user.

In an exemplary embodiment, the center can associate tools or assets (e.g., human or machine) with communication paths or channels. For example, personnel numbers (displayed on uniforms) or truck or car identification numbers can be correlated with communication information. For example, Car 54 can be reached on police channel 22. Presence can correlate or group identification information (stored, for example, within a database of the center or other database accessible to the center) for each entity (person, truck, car, squad, agency, and so forth) so that if one of the identifications is known, the other identifications associated with the entity can also be accessed and used. This information can include, for example, a person's name, call-sign, telephone number (e.g. home, cell, work, . . . ), badge number, uniform or badge color(s). Presence can also include any information regarding the entity, for example medical information such as blood type and allergies, next of kin, power of attorney, security clearance, skill ratings, qualifications, performance capabilities or other characteristics (e.g. pumping capacity of a fire truck, personnel capacity of a transport vehicle, equipment lists, etc.), role in a playbook or response plan, and so forth. Information associated with an entity can include an emergency response plan. The same information (e.g. an emergency response plan) can be associated with multiple entities, and can be provided as one or more "play book(s)" that can be referred to at any time, and which can also be updated on the fly (e.g. in the midst of an emergency to improve or harmonize the efforts of participating entities), and updates can be marked or broadcast to alert all participants of updates or changes.

In an exemplary embodiment, Presence Servers installed on all jurisdiction networks (e.g., in a center such as the centers 104, 204, 206, 207, or located elsewhere but configured to report to a center) can keep track of calling groups on single systems and provide that information, e.g. to LOCC(s) (Local Operating Control Center(s)) and ROCC(s) (Remote Operating Control Center(s)) and MOCC(s) (Mobile Operating Control Center(s)) so that if it is necessary to join or create a conference taking place on a single system LOCC or ROCC or MOCC, the requisite connection(s) can be made. Presence technology available on or to the center can also choose the best available device to present specified information. If a map is to be provided and a PDA is available it would be a better communication device than a phone. In addition to selecting (and/or prompting a user for) an optimum destination for information, Presence technology can automatically select an optimum (defined according to various criteria that can be specified differently in advance and/or on the fly for different situations, for example by speed, robustness, level of security, etc. and any combination or metric thereof) data path through a network from an information source to an information destination.

In an exemplary embodiment, the center can use Presence technology to establish levels of availability which can be used to a) block lower priority communications and/or b) advise callers of the level the target user is at so the caller may use their own judgment to select a priority of the communication and/or choose whether to complete the communication or abandon it. The center can also use Presence technology in connection with location-based services, e.g. services that provide location information. Presence can function as an active, central repository for location information, for example location information provided by services/technologies such as 911 location technology which can periodically or continuously monitor the location of each user and provide the location information to Presence. In addition, Presence can store all communications and related actions/selections by participants (and entities seeking to participate), for example to provide a historical record for later review and critique, for example in the data storage 312 of a center.

Exemplary embodiments of the present invention include one or more Smart Network Platforms (SNPs) that support full interoperability among existing and future systems, handle the required communication volume, extend the radio range when needed and support voice, video and data distribution to decision makers and field personnel. These exemplary embodiments are operationally and financially practical, useable day in and day out, can be quickly implemented, and offer a complete solution to the interoperability problems described above. In exemplary embodiments of the present invention, any user on any system can communicate with any other user on any system. Links between any radio and any operating wired or wireless telephone can be established. Independent local and long range communication are provided, for example through HF (High Frequency), VHF (Very High Frequency), UHF (Ultra High Frequency), microwave, and satellite radio communications. Any combination of users on any system can conference on the fly. An Emergency Alert System is supported, and provides a mechanism to alert all responders or selected groups of responders of imminent danger or other necessary, time-critical information. In addition, sufficient communication paths are provided (or can be scaled) to deal with all emergencies. For example, exemplary embodiments of the present invention simultaneously support hundreds of separate communication paths, and can be scaled to support any desired number of communication paths. Automated ad-hoc conferencing capability is provided, and connections are quickly provided and fully supported even when the system is under stress. Exemplary embodiments include presence-detection, to automatically identify devices or capabilities within the communication system, and can also provide the physical (e.g., geographic) and/or virtual (e.g., logical location in the system) of participants communicating via the system. Exemplary embodiments of the present invention include one or more Remote Operations Control Centers (ROCCs), to ensure maximum performance, full redundancy, and provide failure avoidance. Exemplary embodiments include fixed, mobile and transportable Information Technology platforms, to overcome radio range limitations and ensure continuity and coherence of emergency communications.

Furthermore, exemplary embodiments of the present invention overcome potential difficulties that can be encountered with trunked/repeater systems. For example, radios operating in an intersection zone of overlapping repeater/trunk system coverage areas, can be interconnected via exemplary embodiments of the present invention, so all radios on one system can communicate with all radios on the other systems, thus providing coverage anywhere within the intersection zone. However, if the incident occurs outside the overlap, then responders at the incident whose radios are outside their coverage may not work. To overcome this fringe area problem, exemplary embodiments of the present invention include transportable and mobile interoperable links to provide extended coverage and signal relay. Thus, deployable (e.g., transportable, mobile) systems overcome range limitations of the main transmitters. Transportable and mobile systems work in fringe areas, and provide links to the main base stations of each permanent system, thus expanding the coverage of the permanent systems.

Exemplary embodiments of the present invention can be implemented using known, proven technology, at a fraction of the cost to replace all field radios. In addition, Exemplary embodiments of the present invention can be scaled to fit the emergency and local conditions, are quickly deployable as fixed and/or transportable versions, and allow real-time communication network reconfiguration to quickly adapt to the changing nature of emergencies, via a combination of automated and human control/interface with central control. Minimal change to existing communications is required, because field personnel continue to use existing radios; replacement of radio infrastructure is not required, and personnel costs are minimal because a single Interoperability or Operating Control Center can control multiple sites. In addition, redundant systems such as Remote Operating Control Centers (ROCCs) can provide interoperable communications and backup, e.g. via PSTN and Internet, and long range capability can link Federal and State resources to render aid to the incident site. In addition, a ROCC can be maintained "on-call", fully and continuously staffed with trained technicians on duty 24/7 to provide immediate incident response and to assure system readiness. In accordance with exemplary embodiments of the present invention, multiple ROCCs can augment or replace any impaired or disabled ROCC, and a ROCC can be used in day-to-day activities and for emergency exercises and training.

Software packages, elements or modules for variously providing the functions described herein, can be implemented on a computer. These software processes running on the computer can additionally or alternatively be implemented in a distributed fashion external to the network using for example distributed computing resources, and/or can be implemented using resources of the network.

The methods, logics, techniques and pseudocode sequences described herein can be implemented in a variety of programming styles (for example Structured Programming, Object-Oriented Programming, and so forth) and in a variety of different programming languages (for example Java, C, C++, C#, Pascal, Ada, and so forth). In addition, those skilled in the art will appreciate that the elements and methods or processes described herein can be implemented using a microprocessor, computer, or any other computing device, and can be implemented in hardware and/or software, in a single physical location or in distributed fashion among various locations or host computing platforms. Agents can be implemented in hardware and/or software or computer program(s) at any desired or appropriate location. Those skilled in the art will also appreciate that software or computer program(s) can be stored on a machine-readable medium, wherein the software or computer program(s) includes instructions for causing a computing device such as a computer, computer system, microprocessor, or other computing device, to perform the methods or processes.

A machine readable medium can include software or a computer program or programs for causing a computing device to perform the methods and/or techniques described herein.

It will also be appreciated by those skilled in the art that the present invention can be embodied in other specific forms without departing from the spirit or essential characteristics thereof, and that the invention is not limited to the specific embodiments described herein. The presently disclosed embodiments are therefore considered in all respects to be illustrative and not restrictive. The scope of the invention is indicated by the appended claims rather than the foregoing description, and all changes that come within the meaning and range and equivalents thereof are intended to be embraced therein. The term "comprising" as used herein is open-ended and not exclusive.

The invention claimed is:

1. A system comprising a first device for interlinking communication devices having different communication mechanisms, the first device comprising:
   a plurality of radios that are software configurable to operate on different channels, and/or different frequencies, and/or via different protocols;
   a switch arranged to selectively interconnect audio signals with audio inputs of at least one of the plurality of radios, wherein the audio signals are at least one of provided by an operator of the first device and include demodulated audio output of one of the plurality of radios; and
   at least one squelch mechanism configured to filter the demodulated audio output of one of the plurality of radios so that syllabic speech included in the demodulated audio output is transmitted to at least one of the communication devices while noise or silence contained in the demodulated audio output together with the syllabic speech is prevented from being transmitted to the at least one of the communication devices, wherein the at least one squelch mechanism is configured to distinguish syllabic speech included in the demodulated audio output from at least one of noise and silence contained in the demodulated audio output based on the symmetry of an audio waveform in the demodulated audio output, and wherein the at least one squelch mechanism determines that syllabic speech is asymmetric in comparison to the least one of the noise and silence contained in the demodulated audio output, and wherein the at least one squelch mechanism is configured to distinguish syllabic speech included in the demodulated audio output from noise contained in the demodulated audio output by measuring a total signal energy of the demodulated audio output over a period of time, determining a rate of change and duration of change in the signal energy level over the period time, and distinguishing syllabic speech included in the demodulated audio output from noise contained in the demodulated audio output based on the determined rate of change and duration of change in the signal energy level over the period of time.

2. The system of claim 1, wherein the squelch mechanism is selected for application to the demodulated audio output by an operator of the first device.

3. The system of claim 1, the first device comprising communication connections to a public switched telephone network.

4. The system of claim 1, wherein the radios include frequency-agile radios, wide band radios, and sweep-type radios.

5. The system of claim 1, comprising a second device for interlinking communication devices having different communication mechanisms, the second device comprising:
   a plurality of radios that are software configurable to operate on different channels, and/or different frequencies, and/or via different protocols; and
   a switch arranged to selectively interconnect audio signals with audio inputs of at least one of the plurality of radios, wherein the audio signals are provided by an operator of the first device or comprise demodulated audio output of one of the plurality of radios;
   wherein the second device communicates with and controls the first device.

6. The device of claim 5, wherein each of the first and second devices includes a display showing communication channels awaiting processing of a communication request.

7. The device of claim 6, wherein the displayed channels are listed in chronological order of receipt and entities known to be participating on each channel are displayed.

8. The system of claim 1, wherein the plurality of radios are software configurable to operate via different protocols.

9. The system of claim 1, comprising a demodulated voice processor configured to at least one of overcome or compensate for different ways that voices are sampled or recreated among the audio inputs.

10. The system of claim 1, wherein the first device is at least one of transportable or mobile.

11. A method for interlinking disparate communication systems, comprising:
   receiving communications from the disparate communication systems at a center including, for each disparate communication system, at least one radio configured to communicate with that system;
   selectively interconnecting the audio outputs and audio inputs of the radios to interconnect the disparate communication systems;
   applying at least one squelch filter to the audio outputs to filter the audio outputs so that syllabic speech included in the audio outputs is transmitted to at least one of the communication systems while noise or silence contained in the audio outputs together with the syllabic speech is prevented from being transmitted to the at least one of the communication systems,
   wherein the applying of the at least one squelch mechanism distinguishes syllabic speech included in the audio outputs from at least one of noise and silence contained in the demodulated audio output based on the symmetry of an audio waveform in the audio outputs,
   wherein the at least one squelch mechanism determines that syllabic speech is asymmetric in comparison to the least one of the noise and silence contained in the demodulated audio output,
   wherein the applying of the at least one squelch mechanism comprises distinguishing syllabic speech included in the audio outputs from noise contained in the audio outputs by measuring a total signal energy of the audio outputs over a period of time, determining a rate of change and duration of change in the signal energy level over the period time, and distinguishing syllabic speech included in the audio outputs from noise contained in the audio outputs based on the determined rate of change and duration of change in the signal energy level over the period of time, and
   wherein the interconnecting is based on at least one of a filtered output, a hierarchy of the disparate communication systems, and a command input by a human operator.

12. The method of claim 11, comprising receiving an operator's selection of a particular squelch filter from among a plurality of squelch filters, for application to audio output of at least one of the radios.

13. A system comprising a first device for interlinking communication devices having different communication mechanisms, the first device comprising:
   a plurality of communication devices that operate on different channels, and/or different frequencies, and/or via different protocols;
   a switch arranged to selectively interconnect communication signals with communication inputs of at least one of the plurality of communication devices, wherein the communication signals are at least one of provided by an operator of the first device and include demodulated communication output of one of the plurality of communication devices; and
   at least one squelch mechanism configured to filter the demodulated audio output of one of the plurality of communication devices so that syllabic speech included in the demodulated audio output is transmitted to at least one other one of the communication devices while noise or silence contained in the demodulated audio output together with the syllabic speech is prevented from being transmitted to the at least one of the other one of the communication devices,
   wherein the at least one squelch mechanism is configured to distinguish syllabic speech included in the demodulated audio output from at least one of noise and silence contained in the demodulated audio output based on the symmetry of an audio waveform in the demodulated audio output,
   wherein the at least one squelch mechanism determines that syllabic speech is asymmetric in comparison to the least one of the noise and silence contained in the demodulated audio output, and wherein the at least one squelch mechanism is configured to distinguish syllabic speech included in the demodulated audio output from noise contained in the demodulated audio output by measuring a total signal energy of the demodulated audio output over a period of time, determining a rate of change and duration of change in the signal energy level over the period time, and distinguishing the syllabic speech included in the demodulated audio output from the noise contained in the demodulated audio output based on the determined rate of change and duration of change in the signal energy level over the period of time.

14. The system of claim 13, wherein the squelch mechanism is selected for application to the demodulated communication output by an operator of the first device.

15. The system of claim 13, the first device comprising communication connections to a public switched telephone network.

16. The system of claim 13, wherein the communication devices include frequency-agile communication devices, wide band communication devices, and sweep-type communication devices.

17. The system of claim 13, comprising a second device for interlinking communication devices having different communication mechanisms, the second device comprising:
a plurality of communication devices that operate on different channels, and/or different frequencies, and/or via different protocols; and
communication inputs of at least one of the plurality of communication devices, wherein the communication signals are provided by an operator of the first device or comprise demodulated communication output of one of the plurality of communication devices;
wherein the second device communicates with and controls the first device.

18. The device of claim 17, wherein each of the first and second devices includes a display showing communication channels awaiting processing of a communication request.

19. The device of claim 18, wherein the displayed channels are listed in chronological order of receipt and entities known to be participating on each channel are displayed.

20. The method of claim 13, wherein at least one of the plurality of communication devices are software configurable.

21. A method for interlinking disparate communication systems, comprising:
receiving communications from the disparate communication systems at a center including, for each disparate communication system, at least one communication device configured to communicate with that system;
selectively interconnecting the communication outputs and communication inputs of the communication devices to interconnect the disparate communication systems; and
applying at least one squelch filter to the communication outputs to filter the communication outputs so that syllabic speech included in the communication outputs is transmitted to at least one of the communication systems while noise and silence contained in the communication outputs together with the syllabic speech is prevented from being transmitted to the at least one of the communication systems,
wherein the applying of the at least one squelch mechanism distinguishes syllabic speech included in the audio outputs from at least one of noise and silence contained in the demodulated audio output based on the symmetry of an audio waveform in the audio outputs,
wherein the at least one squelch mechanism determines that syllabic speech is asymmetric in comparison to the least one of the noise and silence contained in the demodulated audio output,
wherein the interconnecting is based on at least one of a filtered output, a hierarchy of the disparate communication system, and a command input by a human operator,
wherein the applying of the at least one squelch mechanism comprises distinguishing syllabic speech included in the audio outputs from noise contained in the audio outputs by measuring a total signal energy of the audio outputs over a period of time, determining a rate of change and duration of change in the signal energy level over the period time, and distinguishing the syllabic speech included in the audio outputs from the noise contained in the audio outputs based on the determined rate of change and duration of change in the signal energy level over the period of time.

22. The method of claim 21, comprising receiving an operator's selection of a particular squelch filter from among a plurality of squelch filters, for application to communication output of at least one of the communication devices.

23. The method of claim 21, wherein at least one of the plurality of communication devices of the second device are software configurable.

* * * * *